(12) United States Patent
Stone et al.

(10) Patent No.: US 11,527,063 B2
(45) Date of Patent: Dec. 13, 2022

(54) VISUALIZATION OF NON-CONFORMANCE OF OBJECTS VIA HEAT MAPS

(71) Applicant: Raytheon Company, Waltham, MA (US)

(72) Inventors: Kristen Stone, Townsend, MA (US); James S. Neil, Groton, MA (US)

(73) Assignee: Raytheon Company, Waltham, MA (US)

( * ) Notice: Subject to any disclaimer, the term of this patent is extended or adjusted under 35 U.S.C. 154(b) by 143 days.

(21) Appl. No.: 17/002,306

(22) Filed: Aug. 25, 2020

(65) Prior Publication Data

US 2022/0067373 A1    Mar. 3, 2022

(51) Int. Cl.
| | |
|---|---|
| G06V 20/20 | (2022.01) |
| G06F 16/903 | (2019.01) |
| G09B 5/02 | (2006.01) |
| G06V 30/10 | (2022.01) |
| G06K 7/10 | (2006.01) |
| G06K 7/14 | (2006.01) |
| G06T 7/00 | (2017.01) |
| G06T 11/00 | (2006.01) |
| G06T 11/20 | (2006.01) |
| G09B 19/00 | (2006.01) |

(52) U.S. Cl.
CPC ........ *G06V 20/20* (2022.01); *G06F 16/90335* (2019.01); *G06K 7/10366* (2013.01); *G06K 7/1413* (2013.01); *G06K 7/1417* (2013.01); *G06T 7/0004* (2013.01); *G06T 11/001* (2013.01); *G06T 11/206* (2013.01); *G09B 5/02* (2013.01); *G09B 19/003* (2013.01); *G06T 2200/24* (2013.01); *G06T 2207/30141* (2013.01); *G06V 30/10* (2022.01)

(58) Field of Classification Search
CPC .. G06V 20/20; G06V 30/10; G06F 16/90335; G06K 7/10366; G06K 7/1413; G06K 7/1417; G06T 7/0004; G06T 11/001; G06T 11/206; G06T 2200/24; G06T 2207/30141; G09B 5/02; G09B 19/003
See application file for complete search history.

(56) References Cited

U.S. PATENT DOCUMENTS

| | | |
|---|---|---|
| 9,589,390 B2 | 3/2017 | Destories et al. |
| 9,897,434 B2 | 2/2018 | Ackley et al. |
| 10,078,916 B2 | 9/2018 | Elazary et al. |
| 10,360,728 B2 | 7/2019 | Venkatesha et al. |

(Continued)

OTHER PUBLICATIONS

"International Application Serial No. PCT/US2021/046692, International Search Report dated Nov. 17, 2021", 5 pgs.

(Continued)

*Primary Examiner* — Jitesh Patel
(74) *Attorney, Agent, or Firm* — Schwegman Lundberg & Woessner, P.A.

(57) ABSTRACT

An image of an object is received into an augmented reality (AR) device. Information is received for identifying the object or a component associated with the object. A database is accessed to retrieve data relating to the object or the component associated with the object, and a heat map is created as a function of the data relating to the object or the component associated with the object. The heat map is displayed on a computer display device.

19 Claims, 8 Drawing Sheets

(56) References Cited

U.S. PATENT DOCUMENTS

| | | | |
|---|---|---|---|
| 2014/0082417 A1* | 3/2014 | Barton | G06F 11/0793 |
| | | | 714/26 |
| 2018/0129276 A1* | 5/2018 | Nguyen | G06F 3/011 |
| 2020/0118345 A1 | 4/2020 | Scott et al. | |
| 2020/0160083 A1* | 5/2020 | Zhu | G06T 7/001 |

OTHER PUBLICATIONS

"International Application Serial No. PCT/US2021/046692, Written Opinion dated Nov. 17, 2021", 7 pgs.

Khhuong, Bui Minh, et al., "The effectiveness of an AR-based context-aware assembly support system in object assembly", IEEE Virtual Reality, (Mar. 29, 2014), 57-62.

Miller, A, et al., "Interactive 3D Model Acquisition and Tracking of Building Block Structures", IEEE Transactions on Visualization and Computer Graphics, vol. 18, No. 4, (Apr. 1, 2012), 651-659.

* cited by examiner

| LEVEL | RISK FACTOR ($P_f \times C_f$) |
|---|---|
| HIGH | 0.50 - 1.0 |
| MODERATE | 0.25 - 0.49 |
| LOW | 0.01 - 0.24 |

| LEVEL | OPPORTUNITY FACTOR ($B_f \times F_f$) |
|---|---|
| HIGH | 15 - 25 |
| MODERATE | 7 - 14 |
| LOW | 1 - 6 |

VISUALIZATION OF NON-CONFORMANCE OF OBJECTS VIA HEAT MAPS

TECHNICAL FIELD

The present disclosure relates to the visualization of non-conformance of objects via heat maps, and in an embodiment, but not by way of limitation, the visualization of non-conformance of objects via heat maps using augmented reality.

BACKGROUND

There is a desire within any manufacturing environment to reduce the risk associated with manufacturing processes, especially processes that involve human steps or interactions. Such a reduction in the risk should result in a reduction in defects and non-conformances in the products produced by the manufacturing processes.

For example, in the manufacture of circuit card assemblies (CCAs), it is desirable to reduce the percentage of defects in the finished product. This is presently accomplished in several ways. A trained operator can examine the product and determine if there are any non-conformances in the finished product. The trained operator can use one or more pieces of equipment to aid in this examination, such as an x-ray machine. However, some non-conformances can be missed because the amount of CCAs produced by a production line in a day can be quite large, and the operator can become fatigued. Additionally, current examination procedures do not have any aggregation of data relating to failures that can be used by the operator.

BRIEF DESCRIPTION OF THE DRAWINGS

FIGS. 1A, 11B, and 1C are block diagrams of an embodiment of a system for determining non-conformance of an object.

DETAILED DESCRIPTION

In the following description, for purposes of explanation, numerous specific details are set forth in order to provide a thorough understanding of the various aspects of different embodiments of the present invention. It will be evident, however, to one skilled in the art, that the present invention may be practiced without all the specific details and/or with variations, permutations, and combinations of the various features and elements described herein.

An embodiment of the present disclosure relates to leveraging object character recognition (OCR) capabilities in supporting manufacturing operations. The embodiment can be implemented on a mobile device. The embodiment can be linked with risk and opportunity management processes (risk-probability matrix, waterfall charts, etc.). A full digital make-up of the manufacturing operations can be created, and past, present, and future data on manufacturing (assembly, inspection, test procedures) can be displayed to a person involved in the manufacturing operation on any device. The embodiment can leverage visualization techniques to provide heat maps, and risk and opportunity waterfall charts, to assist in manufacturing or maintenance procedures. These heat maps can illustrate high probability areas for failure in the manufacturing process. Additionally, an embodiment can provide overlays or display high level data for manufacturing and maintenance environments.

In real time, data aggregation techniques (waterfall and probability maps) can be visually represented on computer card assemblies (CCA) and other hardware and manufactured products (such as automobiles, planes, cabinets, and additive manufactured products) to assist in augmentation in an augmented reality (AR) environment for work instructions, test assessments/troubleshooting, and inspection operations. Manufacturing real time data and historical data can be leveraged to provide heat maps of risks and opportunities within the non-conformances. For example, an inspection task can highlight high risk areas that have failed within the most recently manufactured units. A test engineer can then access data relating to the most recently failed components or parts to help provide real updates on past data. Visualization of these data can be shown on a mobile device or other devices.

Figure 1A:
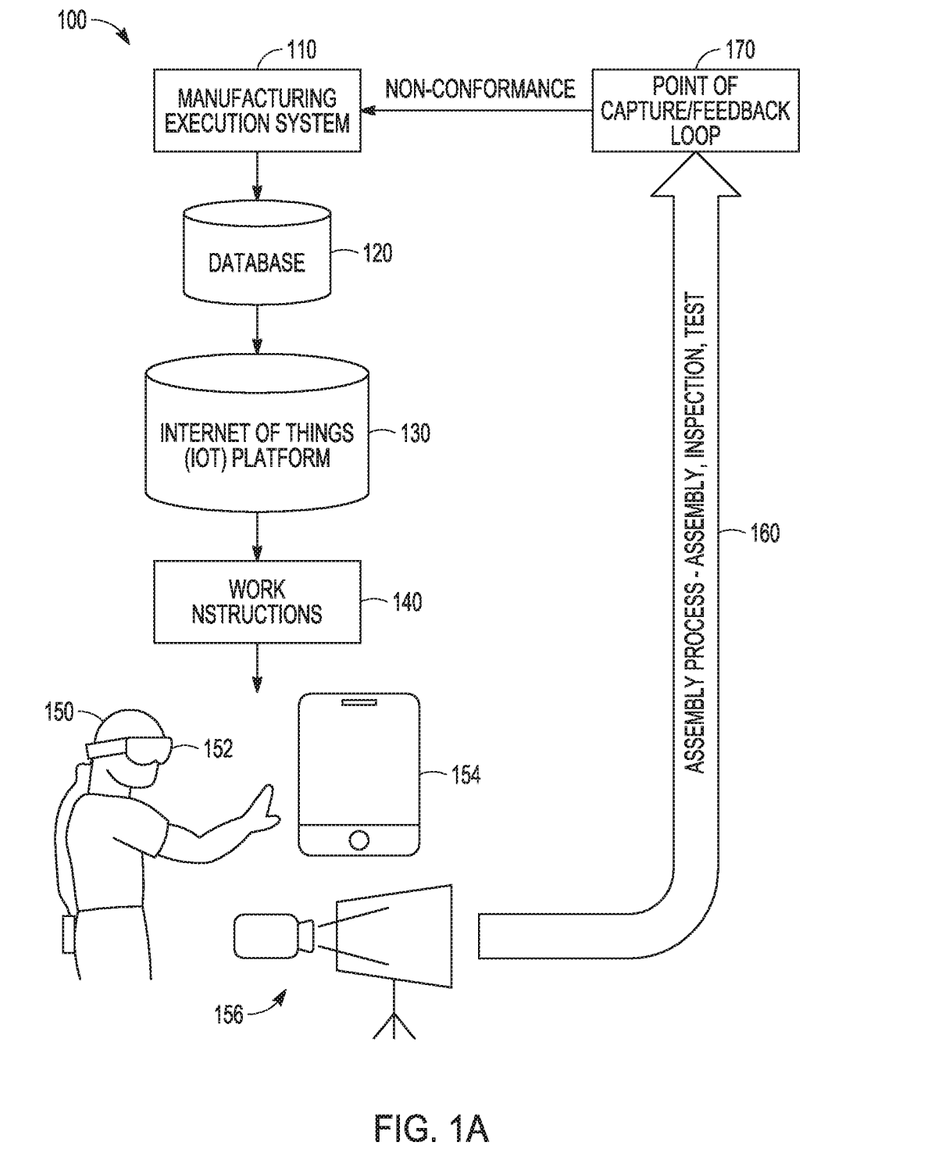

FIG. 1A is a block diagram of an embodiment of a system for determining non-conformance of an object. An AR system 100 works in conjunction with a manufacturing system 110. The system includes a database 120, which includes data such as a history of the manufacturing processes and the products manufactured by the manufacturing processes. As noted above, these data are used in the AR system to identify historical non-conformances in the manufacturing process. The AR system 100 can further include an Internet of Things (IOT) platform 130. For example, the manufactured good itself can have Internet-access capabilities, and these capabilities can be used to retrieve data over the Internet and share data over the Internet. At 140, using the database 120 and/or the IOT platform 130, information is provided about the manufactured good such as maintenance procedures, installation procedures, replacement procedures, assembly procedures, inspection procedures, and test procedures. As indicated at 150, this information can be provided to manufacturing personnel via an AR headset 152, a mobile device 154, and/or some type of computer display device 156. At 160, information relating to the actual maintenance procedures, installation procedures, replacement procedures, assembly procedures, inspection procedures, and test procedures that were performed on the manufactured good are captured at 170 and provided as feedback in the AR system 100.

Figure 1B:
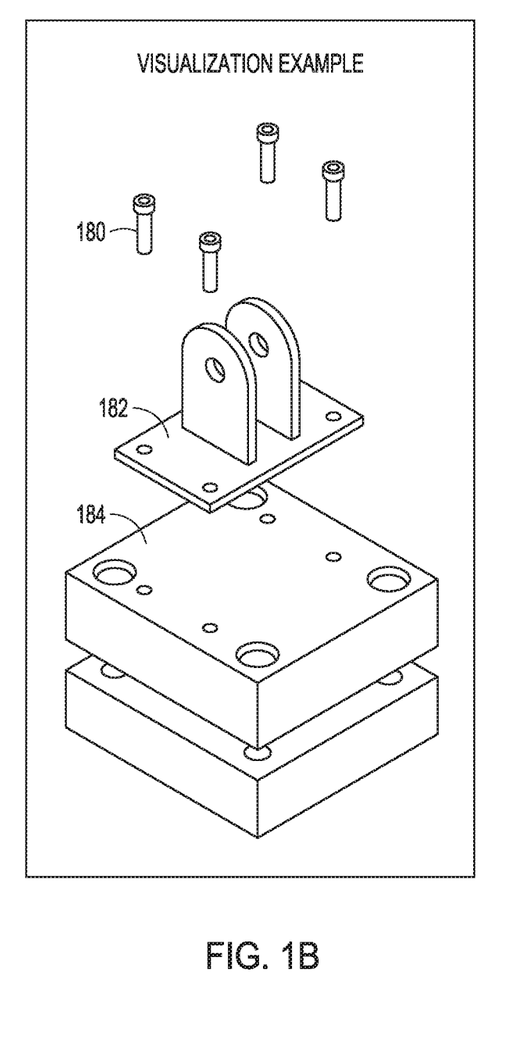
Figure 1C:
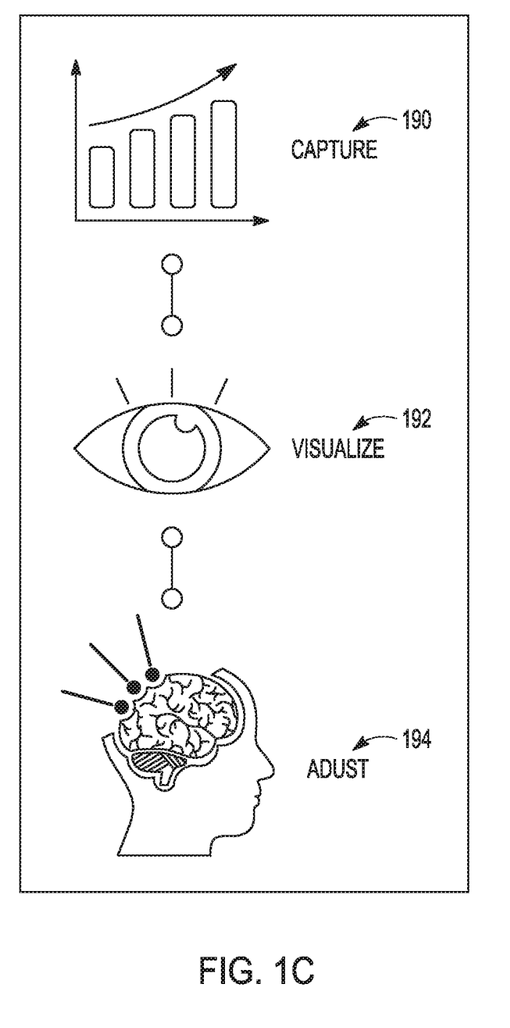

FIG. 1B illustrates an example of a visualization. In FIG. 1B, the system displays components 182 and 184, and several fasteners 180 to couple the components 182 and 184. The visualization can further include instructions such as a fastening pattern and the amount of torque to be applied to the fasteners. As indicated in FIG. 1C, the system 100 permits manufacturing personnel to consider captured data at 190, to visualize the maintenance procedures, installation procedures, replacement procedures, assembly procedures, inspection procedures, and test procedures at 192, and to make any needed adjustments via the maintenance procedures, installation procedures, replacement procedures, assembly procedures, inspection procedures, and test procedures at 194.

Figure 2:
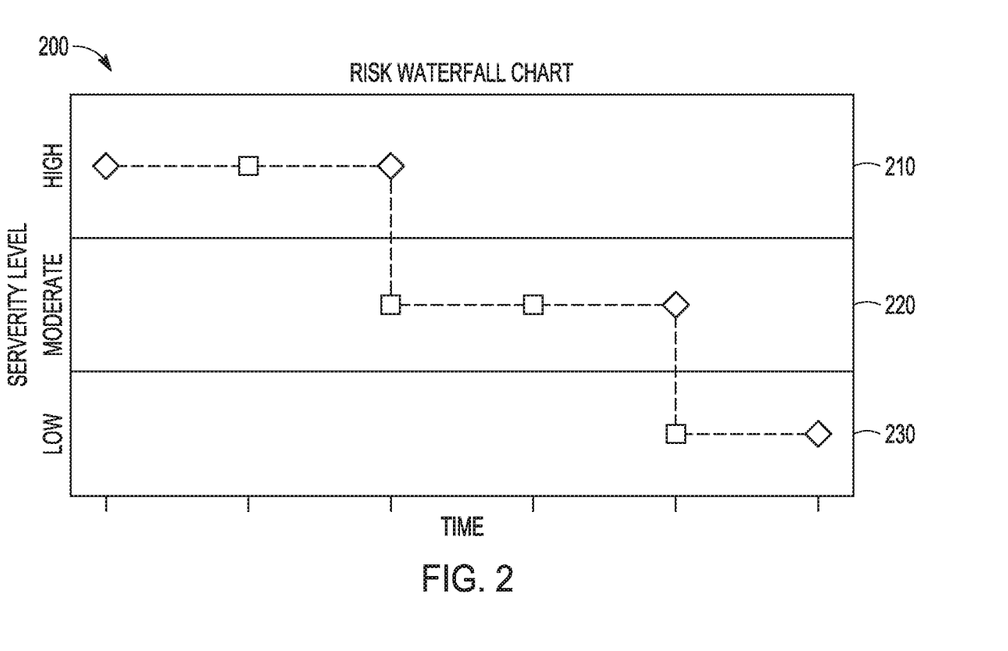
FIG. 2 is an example of a risk waterfall chart.
Figure 3:
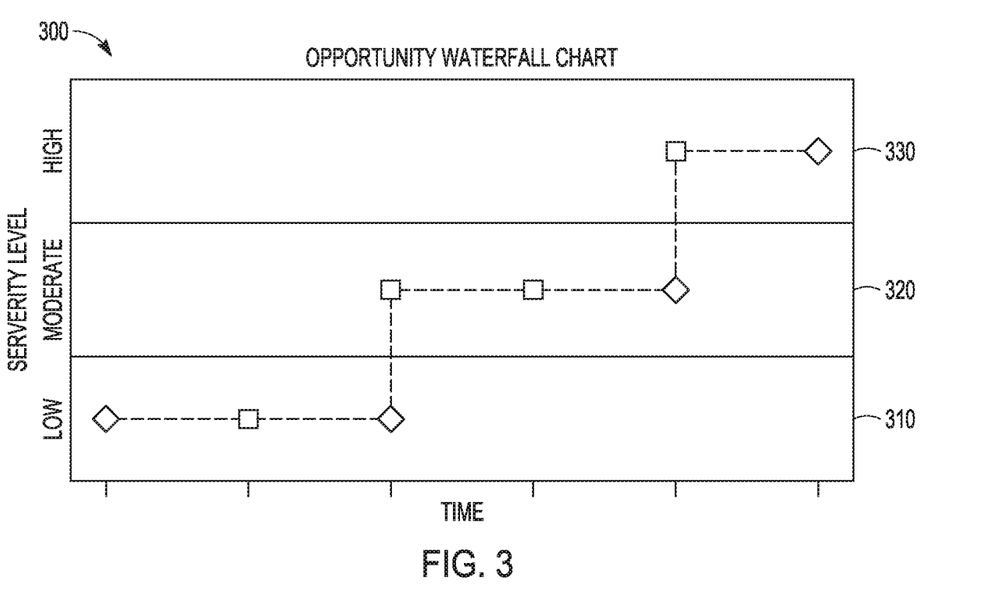
FIG. 3 is an example of an opportunity waterfall chart.

FIG. 2 is an example of a risk waterfall chart 200. As time proceeds and the AR system 100 is used to identify and react to non-conformances, the severity levels of the non-conformances fall from highly severe 210, to moderately severe 220, to a low severity 230. The severities can be color-coded, such as red for highly severe 210, yellow for moderately severe 220, and green for the low severity 230. FIG. 3 is an example of an opportunity waterfall chart 300. As time proceeds and the AR system 100 is used to identify and react to non-conformances, new opportunities are taken. However, with these new opportunities, over time, the severity level rises from a low severity level at 310, to a moderate severity level at 320, to a high severity level at 330. Like with the risk waterfall chart 200, the severities can be color-coded in the opportunity waterfall chart 300, such as red for highly severe 330, yellow for moderately severe 320, and green for the low severity 310.

Figure 4:
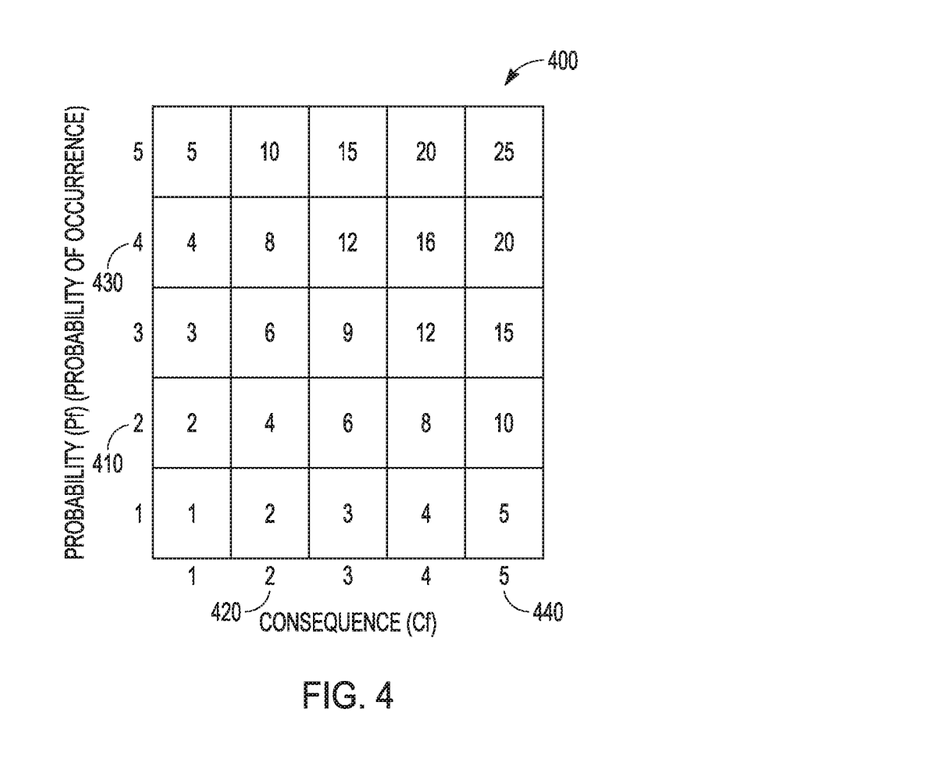
FIG. 4 is an example of a probability-consequence chart.
Figure 5:
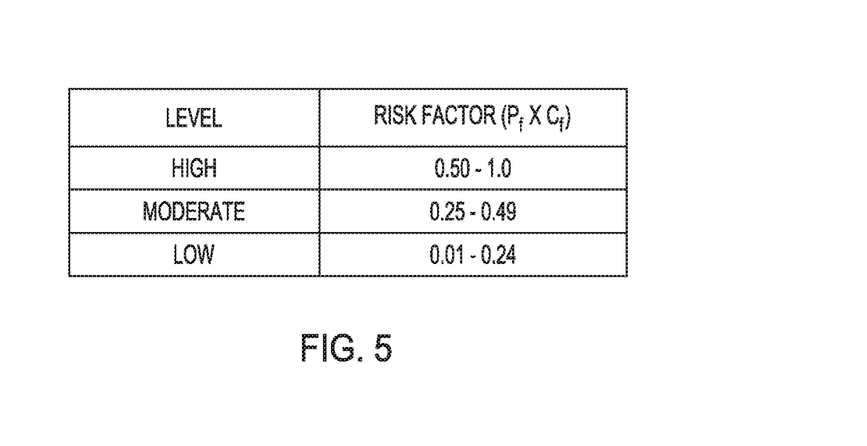
FIG. 5 is an example of ranges that can be used to determine the risk factors in the probability-consequence chart of FIG. 4.

FIG. 4 is an example of a probability-consequence chart 400. The probability-consequence chart is used to determine the risk factor for the risk waterfall chart 200. For example, if there is a low probability of occurrence of an event, e.g., a 2 at 410, and a low consequence if that event occurs, e.g., a 2 at 420, then the risk factor is a relatively low 4 (i.e., the product of the two). However, if there is a high probability of occurrence of an event, e.g., a 4 at 430, and a high consequence if that event occurs, e.g., a 5 at 440, then the risk factor is a relatively high 20. FIG. 5 illustrates examples of ranges that can be used to determine these risk factors.

Figure 6:
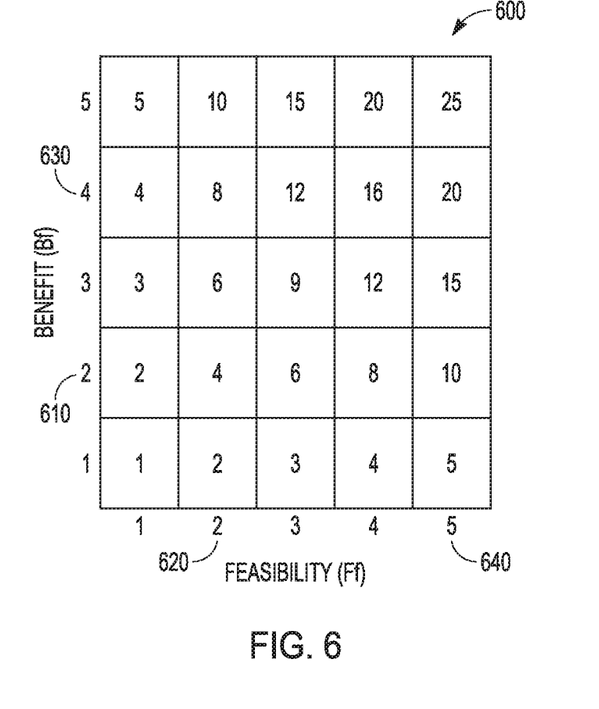
FIG. 6 is an example of a benefit-feasibility chart.
Figure 7:
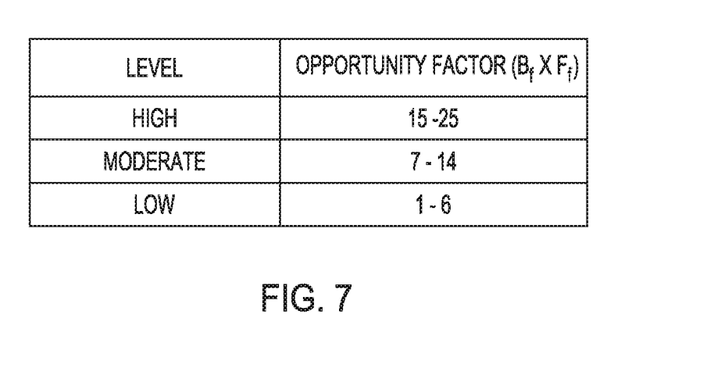
FIG. 7 is an example of ranges that can be used to determine the opportunity factors in the benefit-feasibility chart of FIG. 6.

FIG. 6 is an example of a benefit-feasibility chart. The benefits-feasibility chart 600 is used to determine the opportunity factor for the opportunity waterfall chart 300. For example, if there is a low benefit associated with the occurrence of an event, e.g., a 1 at 610, and a low consequence if that event occurs, e.g., a 2 at 620, then the opportunity factor is a relatively low 2. However, if there is a high benefit associated with the occurrence of an event, e.g., a 4 at 630, and a high consequence if that event occurs, e.g., a 5 at 640, then the opportunity factor is a relatively high 20. FIG. 7 illustrates examples of ranges that can be used to determine these opportunity factors.

Figure 8A:
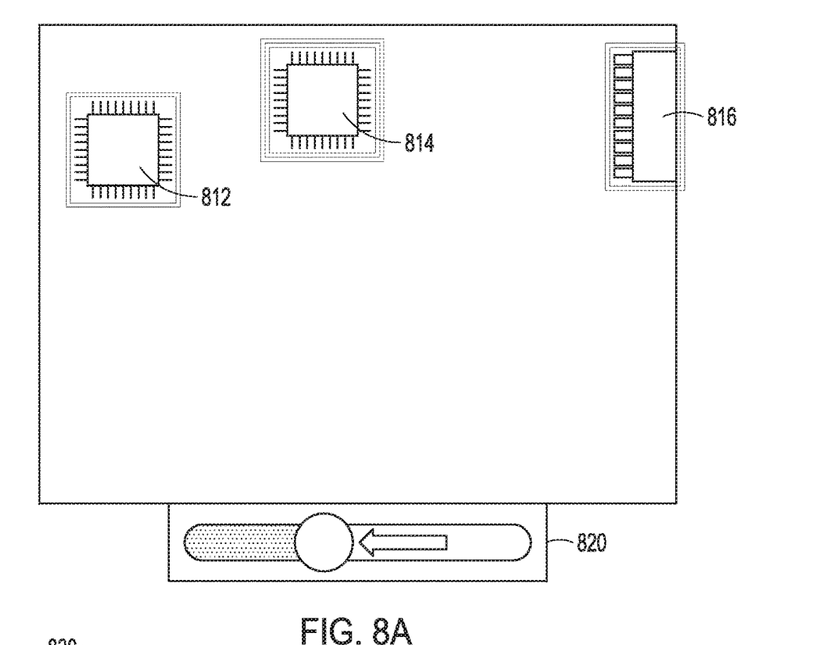
FIGS. 8A and 8B are examples of heat maps that are associated with a printed circuit board.
Figure 8B:
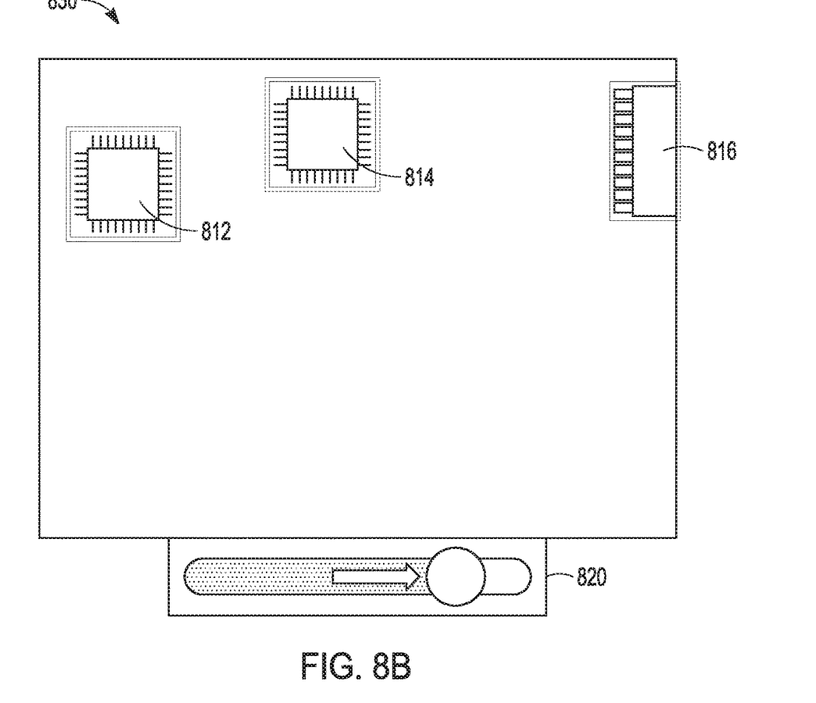

FIGS. 8A and 8B are examples of heat maps 810 and 830 that are associated with a printed circuit board. The heat maps 810 and 830 are a way to visualize trends in manufacturing data historically. For example, if manufacturing personnel are actively inspecting a particular type of board over a time period, they may be able to see as the color shifts from red to yellow indicating the manufacturing quality is moving in the right direction for that particular board or product line. But if the manufacturing person starts up a new run from the day before or takes over from a prior shift, that person, without the benefits of the heat map, won't have any reference for how that part has performed up to that point in time. With an embodiment, the person has the ability of showcasing the index/count that they are inspecting, and they can scroll through data based on different snapshots of the board window, and they can understand how the heat map of the board has progressed. This provides opportunities for manufacturing leadership to use heat maps to understand the trend rates of their hardware, to understand and use learning curves, and to better train their employees.

Referring specifically to FIGS. 8A and 8B, in FIG. 8A, component 812 is outlined in two boxes, indicating a color of yellow, which indicates a severity history of moderate, and FIG. 8B illustrates that component 812 still has a moderate severity because it is still enclosed in a yellow box (as indicated by the two boxes). In FIG. 8A, component 814 is outlined in three boxes, indicating a color of red, which indicates a severity history of high, and FIG. 8B illustrates that component 814 has progressed in the proper direction as it is now outlined in a yellow box (two boxes) indicating moderate severity. In FIG. 8A, component 816 is outlined in two boxes, indicating a color of yellow, which indicates a severity history of moderate, and FIG. 8B illustrates that component 816 is now outlined in a single box, indicating a color of green, which indicates that component 816 has improved to a low severity. These progressions indicating a worsening severity and a lessening severity will catch the attention of manufacturing personnel. FIGS. 8A and 8B further illustrate an input device 820, such as a slider, which permits a user such as manufacturing personnel to select a particular object or a particular component of the object on a computer display device. This selection can be used to access a database and retrieve the information about the particular object or the particular component. The input device 820 can further be used to select, for example, the part number of the manufactured good and a specific quantity or date range of when the good was manufactured.

Figure 9:
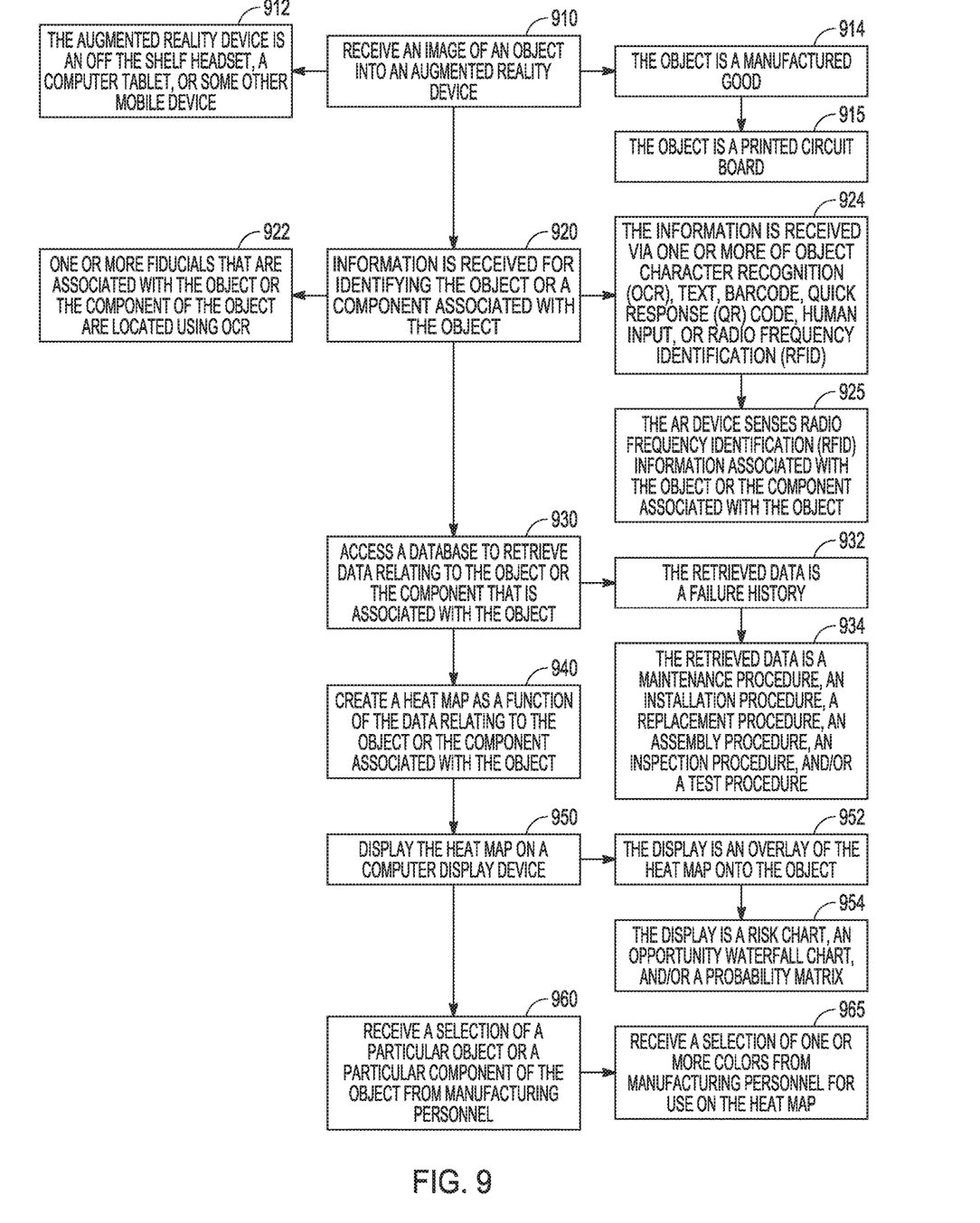
FIG. 9 is a flowchart of an example embodiment of a process for generating a heat map for an object.

FIG. 9 is a flowchart of an example embodiment of a process for generating a heat map for an object. FIG. 9 includes a number of process blocks 910-965. Though arranged substantially serially in the example of FIG. 9, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring specifically now to FIG. 9, at 910, an image of an object is received into an augmented reality device. As indicated at 912, the augmented reality device can be an off the shelf headset, a computer tablet, or some other mobile device. As further indicated at 914, the object can be a manufactured good, and more particularly, the object can be a printed circuit board (915). When the object is a printed circuit board, the heat map can include visual non-conformances on the printed circuit board.

At 920, information is received for identifying the object or a component associated with the object. At 922, one or more fiducials that are associated with the object or the component of the object are located using OCR. In this context, a fiducial is another object that is placed in the field of view of the AR device, and this other object appears in the view of the AR device. This other object can be used as a point of reference or measure. As indicated at 924, the information is received via one or more of object character recognition (OCR), text, barcode, quick response (QR) code, human input, or radio frequency identification (RFID). And as further indicated at 925, the AR device can sense radio frequency identification (RFID) information associated with the object or the component associated with the object.

At 930, a database is accessed to retrieve data relating to the object or the component that is associated with the object. As indicated at 932, the data retrieved from the database relating to the object or the component associated with the object is a failure history of the object or the component associated with the object. The data retrieved from the database can also relate to such things as a maintenance procedure for the object or the component associated with the object, an installation procedure for the object or the component associated with the object, a replacement procedure for the object or the component associated with the object, an assembly procedure for the object or the component associated with the object, an inspection procedure for the object or the component associated with the object, and a test procedure for the object or the component associated with the object (934).

At 940, a heat map is created as a function of the data relating to the object or the component associated with the object, and at 950, the heat map is displayed on a computer display device. As noted above, such a computer display device can be an AR headset, a tablet, a laptop computer, or some other computer device. The display can be an overlay of the heat map onto the object (952). For example, as discussed above, the overlay of the heat map on a printed circuit board can identify components that have recently been experiencing problems, and the overlay can further indicate in which direction the problems associated with the component are trending. In addition to a heat map overlay, the display on the computer display device can include a risk chart, an opportunity waterfall chart, and a probability matrix relating to the object or the component associated with the object (954).

At 960, a selection of a particular object or a particular component of the object is received from manufacturing personnel. This selection is used to access the database and retrieve the information about the particular object or the particular component. In an embodiment, this feature can be implemented using a slider device on a computer display unit. The slider is used to select, for example, the part number of the manufactured good and a specific quantity or date range of when the good was manufactured.

At 965, a selection of one or more colors is received from manufacturing personnel for use on the heat map. This feature is particularly useful for persons who are color-blind to certain colors. This feature, like the feature of operation 960, can be implemented via a slider device on a computer display unit. In another embodiment, color is not used as an indicator on the computer display unit, but different shapes such as circles, triangles, and squares.

Although embodiments have been described with reference to specific examples, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The invention claimed is:

1. A process comprising:
receiving into an augmented reality (AR) device an image of an object;
receiving information for identifying the object or a component associated with the object;
accessing a database to retrieve data relating to the object or the component associated with the object;
creating a heat map as a function of the data relating to the object or the component associated with the object;
displaying the heat map on a computer display device; and
locating one or more fiducials associated with the object or the component associated with the object, wherein the one or more fiducials comprise a second object that is placed in a field of view of the AR device such that the second object comprises a point of reference or measure in the field of view of the AR device or the computer display device.

2. The process of claim 1, wherein the AR device comprises a commercial off the shelf headset, computer tablet, or mobile device.

3. The process of claim 1, wherein the information is received via one or more of object character recognition (OCR), text, barcode, quick response (QR) code, human input, or radio frequency identification (RFID).

4. The process of claim 1, comprising displaying one or more of a maintenance procedure for the object or the component associated with the object, an installation procedure for the object or the component associated with the object, a replacement procedure for the object or the component associated with the object, an assembly procedure for the object or the component associated with the object, an inspection procedure for the object or the component associated with the object, and a test procedure for the object or the component associated with the object.

5. The process of claim 1, comprising displaying on the computer display device one or more of a risk chart, an opportunity waterfall chart, and a probability matrix relating to the object or the component associated with the object.

6. The process of claim 1, wherein the object comprises a manufactured good.

7. The process of claim 6, wherein the manufactured good comprises a printed circuit board, and the heat map comprises visual non-conformances on the printed circuit board.

8. The process of claim 1, comprising overlaying the heat map onto the object using the AR device.

9. The process of claim 1, wherein the data retrieved from the database relating to the object or the component associated with the object comprises a failure history of the object or the component associated with the object.

10. The process of claim 1, comprising receiving a selection of a particular object or a particular component of the object.

11. The process of claim 1, comprising receiving a selection of one or more colors for use on the heat map.

12. A non-transitory computer readable medium comprising instructions that when executed by a computer processor executes a process comprising:
receiving into an augmented reality (AR) device an image of an object;
receiving information for identifying the object or a component associated with the object;
accessing a database to retrieve data relating to the object or the component associated with the object;
receiving a selection of one or more colors from a user for use on a heat map;
creating the heat map as a function of the data relating to the object or the component associated with the object; and
displaying the heat map on a computer display device.

13. The non-transitory computer readable medium of claim 12, comprising locating one or more fiducials associated with the object or the component associated with the object.

14. The non-transitory computer readable medium of claim 12, wherein the information is received via one or more of object character recognition (OCR), text, barcode, quick response (QR) code, human input, or radio frequency identification (RFID).

15. The non-transitory computer readable medium of claim 12, comprising displaying one or more of a maintenance procedure for the object or the component associated with the object, an installation procedure for the object or the component associated with the object, a replacement procedure for the object or the component associated with the object, an assembly procedure for the object or the component associated with the object, an inspection procedure for the object or the component associated with the object, and a test procedure for the object or the component associated with the object.

16. The non-transitory computer readable medium of claim 12, comprising displaying on the computer display device one or more of a risk chart, an opportunity waterfall chart, and a probability matrix relating to the object or the component associated with the object.

17. The non-transitory computer readable medium of claim 12, wherein the object comprises a manufactured good; and wherein the manufactured good comprises a printed circuit board, and the heat map comprises visual non-conformances on the printed circuit board.

18. The non-transitory computer readable medium of claim 12, comprising overlaying the heat map onto the object using the AR device.

19. A system comprising:
an augmented reality device; and
a computer database coupled to the augmented reality device;
wherein the system is operable for:
receiving into the augmented reality device an image of an object;
receiving information for identifying the object or a component associated with the object;
accessing the computer database to retrieve data relating to the object or the component associated with the object;
creating a heat map as a function of the data relating to the object or the component associated with the object;
displaying the heat map on a computer display device; and
locating one or more fiducials associated with the object or the component associated with the object, wherein the one or more fiducials comprise a second object that is placed in a field of view of the AR device such that the second object comprises a point of reference or measure in the field of view of the AR device or the computer display device.

* * * * *

UNITED STATES PATENT AND TRADEMARK OFFICE
CERTIFICATE OF CORRECTION

| | | |
|---|---|---|
| PATENT NO. | : 11,527,063 B2 | Page 1 of 1 |
| APPLICATION NO. | : 17/002306 | |
| DATED | : December 13, 2022 | |
| INVENTOR(S) | : Stone et al. | |

It is certified that error appears in the above-identified patent and that said Letters Patent is hereby corrected as shown below:

In the Drawings

Sheet 1 of 8, Fig. 1A, and on the title page, the illustrative print figure, reference numeral 140, Line 2, delete "NSTRUCTIONS" and insert --INSTRUCTIONS-- therefor In the Specification In Column 1, Line 36, delete "11B," and insert --1B,-- therefor In the Claims In Column 6, Line 43, in Claim 8, delete "obj ect" and insert --object-- therefor In Column 7, Line 14, in Claim 15, delete "obj ect," and insert --object,-- therefor In Column 7, Line 19, in Claim 15, delete "obj ect" and insert --object-- therefor In Column 8, Line 13, in Claim 19, delete "obj ect;" and insert --object;-- therefor Signed and Sealed this
Seventeenth Day of October, 2023

*Katherine Kelly Vidal*
Katherine Kelly Vidal
*Director of the United States Patent and Trademark Office*